United States Patent

Lamberti

[11] Patent Number: 6,062,549
[45] Date of Patent: May 16, 2000

[54] LEAF SPRING STABILISER

[76] Inventor: Antonette I Lamberti, 69 Third Avenue, Inanda, Johannesburg, Gauteng Province, South Africa

[21] Appl. No.: 09/004,308

[22] Filed: Jan. 8, 1998

[30] Foreign Application Priority Data

Jan. 9, 1997 [ZA] South Africa ............................ 97/0162

[51] Int. Cl.⁷ .................................................. B60G 11/02
[52] U.S. Cl. .............................. 267/48; 267/52; 267/260; 267/45
[58] Field of Search .................................. 267/47, 52, 48, 267/49, 243, 263, 232, 233, 45, 46, 38, 53, 266, 43, 44, 267, 262, 271, 261, 270, 259, 260; 280/124.17, 124.174, 124.175, 680, 686; 105/197.05

[56] References Cited

U.S. PATENT DOCUMENTS

| | | | |
|---|---|---|---|
| 314,029 | 3/1885 | Kalina | 267/45 |
| 828,206 | 8/1906 | Hardesty | 267/243 |
| 1,113,941 | 10/1914 | Andersen | 267/45 |
| 1,125,199 | 1/1915 | Sprague | 267/45 |
| 1,147,134 | 2/1915 | Andrew | 267/43 |
| 1,166,564 | 1/1916 | Wilcox | 267/243 |
| 1,195,050 | 8/1916 | McAnulty . | |
| 1,381,255 | 6/1921 | Tisman . | |
| 1,494,627 | 5/1924 | Randolph | 267/45 |
| 1,520,482 | 12/1924 | Shore | 267/45 |
| 1,520,484 | 12/1924 | Shore . | |
| 1,531,899 | 3/1925 | Bailey . | |
| 1,534,533 | 4/1925 | Lutman | 267/45 |
| 1,550,046 | 8/1925 | Randolph . | |
| 1,582,134 | 4/1926 | Fernstrom | 267/45 |
| 1,640,778 | 8/1927 | Laher | 267/45 |
| 1,733,365 | 10/1929 | Beaumont et al. | 267/45 |
| 1,766,451 | 6/1930 | Parker . | |
| 1,778,786 | 10/1930 | Eakin | 267/45 |
| 1,809,959 | 6/1931 | Beaumont | 267/45 |
| 1,899,624 | 2/1933 | MacPherson | 267/270 |
| 2,049,555 | 8/1936 | Zaparka . | |
| 2,251,843 | 8/1941 | Jones | 267/267 |
| 2,358,518 | 9/1944 | Kraft | 267/270 |
| 2,942,869 | 6/1960 | Laher | 267/48 |

FOREIGN PATENT DOCUMENTS 581314   5/1924   France ................................. 267/45

OTHER PUBLICATIONS

"Suntek's Rear Spring Helper Kit" advertisement in *Caravan* (Nov., 1976).

South African Patent application No. 94/3414 filed May 18, 1994 (not published).

*Primary Examiner*—Douglas C. Butler
*Attorney, Agent, or Firm*—Bacon & Thomas

[57] ABSTRACT

A vehicle spring stabilizer has a leaf spring with a connector pivotally secured to each end eye thereof, the connector in the form of a rigid yoke to embrace a vehicle spring assembly and having anti-friction structure in the form of a sleeve on a spacer mounted on a bolt connecting the arms of the yoke.

2 Claims, 1 Drawing Sheet

LEAF SPRING STABILISER

FIELD OF THE INVENTION

This invention relates to a stabiliser for a leaf spring and more particularly for a leaf spring providing suspension for a road vehicle.

BACKGROUND TO THE INVENTION

Many road vehicles include the suspension for the rear axle in the form of a bowed leaf spring assembly between the chassis and each end of the rear axle.

These springs are designed to support a predetermined range of weight and loading. Frequently this design support is exceeded by loading the vehicle directly or by the securing of a trailer of one form or another to the vehicle.

Where such operating conditions are encountered it is known to include leaf spring stabilisers for each spring. Such stabilisers are known to include a further leaf spring blade mounted on top of the vehicle axle and having its ends connected to the leaf spring assembly.

These stabilisers have mitigated damage to the suspensions when overloaded but have had limitations. Some utilise a flexible connection between the stabiliser and spring assembly. Under conditions causing severe flexing of the spring assembly the stabilising effect is lost and failure of the spring assembly can occur.

Where the stabiliser is rigidly secured to the spring assembly the degree of flexing is limited and any movement beyond that limit can cause failure of the stabilising effect.

OBJECT OF THE INVENTION

It is an object of the present invention to provide a spring stabiliser assembly in which the above difficulties are overcome to an appreciable degree.

SUMMARY OF THE INVENTION

According to this invention there is provided a vehicle spring stabiliser unit comprising a leaf spring with a connector for attachment to a vehicle spring assembly pivotally securable to each end and carrying a mounting bracket rigidly spaced apart from the leaf spring with an anti-friction member included in the mounting bracket.

Further features of this invention provide for the mounting bracket to be a yoke engageable around a vehicle leaf spring assembly and for the anti-friction member to be a roller between the arms of the yoke.

The invention also provides for the yoke to be formed as two separate members shaped to engage against the leaf spring and vehicle leaf spring assembly and connected at one end by a bolt carrying a spacer on which is mounted a rotatable sleeve.

Still further features of this invention provide for the bolt engaged through the leaf spring to have a bushing thereon and for the bolt forming part of the mounting bracket to be stepped or provided with a self-locking nut to prevent the members of the yoke from being rigidly clamped against the vehicle leaf spring assembly.

BRIEF DESCRIPTION OF THE DRAWINGS

These and other features of this invention will become apparent from the following description of one example of the spring stabiliser described below. In this description reference will be made to the accompanying drawings in which.

DETAILED DESCRIPTION WITH REFERENCE TO THE DRAWINGS

Figure 1:
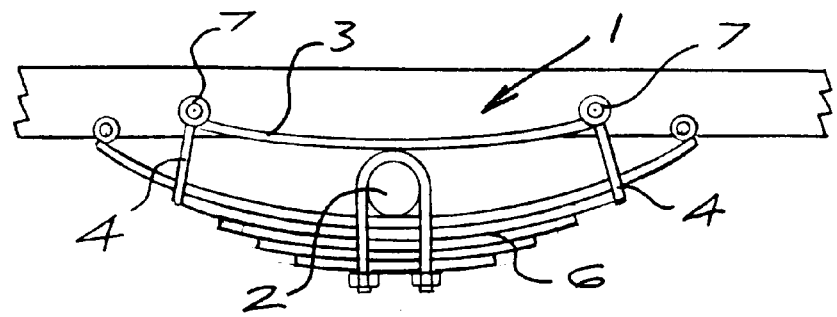
FIG. 1 shows the spring stabiliser in position in use.
Figure 2:
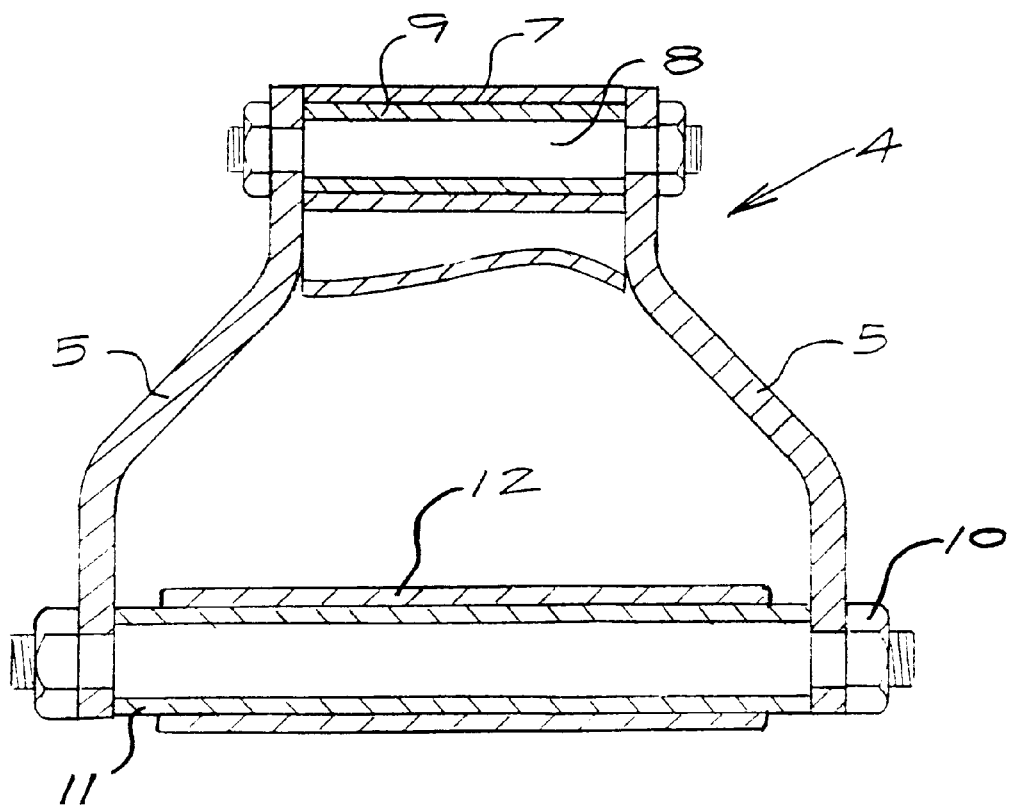
FIG. 2 Shows a transverse cross section through one end of the stabiliser.

As illustrated the spring stabiliser (1) is mounted above the vehicle axle (2) and consists of a leaf spring (3) and connectors (4) at each end of the spring (3).

Each connector (4) consists of a pair of side strap members (5) forming a yoke engaged around the vehicle leaf spring assembly (6). The upper ends of the strap members (5) are connected together and pivotally secured to the eye (7) of the leaf spring (3) by a bolt (8) passed through the strap members (5) and the eye of the leaf spring (3). A bushing (9) is mounted on the bolt (3) to facilitate relative rotational movement between the bolt (8) and the eye (7) of the leaf spring (3).

The lower ends of the strap members (5) are positioned on opposite sides of the vehicle leaf spring assembly (6). The members (5) are connected together by a bolt (10) on which is a spacer (11) which ensures that there can be relative movement between the spring assembly (6) and the strap members (5).

A sleeve (12) is rotatably mounted on the spacer (11).

With the spring stabiliser (1) mounted to the vehicle spring assembly (6) it will be appreciated that as the vehicle spring assembly (6) and leaf spring (3) flex under load during use there will be a small translational movement between the connectors (4) and the vehicle spring assembly (6). The small movement is sufficient to prevent damage to or failure of the stabiliser under severe conditions of use and is accommodated by rotation of sleeve (12) on the spacer (11) and against the vehicle spring assembly (6).

The embodiment above described can be varied in many ways without departing from the scope of the invention, the essential of which is that the connectors (4) can be positioned on a vehicle leaf spring assembly (6) to provide a limited movement between these components.

For example the bolt (8) securing the upper ends of the side straps (5) to the eye of the leaf spring (3) can be fitted with a special lock nut assembly to prevent relative movement of the components causing the nut to unscrew from the bolt. The lower ends of the straps can be held in spaced relationship in any convenient manner which will prevent them from being clamped tight against the side of the vehicle leaf spring assembly. A stepped bolt and self-locking nut can be used to ensure that this does not happen.

The invention provides a spring stabiliser which is simple but effective and reliable and not easily damaged during even severe working conditions.

What I claim as new and desire to secure by Letters Patent is:

1. In a suspension system for a vehicle having a chassis and an axle, wherein a main leaf spring is positioned below and secured at its midpoint to the axle and at its opposite ends to the chassis, a stabiliser leaf spring is positioned above the axle and having its midpoint in engagement with the axle and secured at its opposite ends to the main leaf spring by a pair of yokes, with opposite portions of the main leaf spring extending through the yokes, the yokes each including a pair of spaced straps secured together by an upper bolt and a lower bolt, the opposite ends of the stabiliser leaf spring being pivotally secured to the upper bolts and the opposite portions of the main leaf spring being positioned above the lower bolts, the improvement comprising a spacer on each lower bolt and a rotatable sleeve on each spacer for maintaining a sufficient spacing between the straps of each yoke and permitting free translational movement of the opposite portions of the main leaf spring relative to and through the yokes during overloading of the suspension system to provide stabilization of the effects of the overloading by the stabiliser leaf spring and prevent failure of the suspension system.

2. The suspension system of claim 1, wherein the improvement further includes each upper bolt having a bushing thereon for facilitating relative rotational movement between the opposite ends of the stabiliser leaf spring and the upper bolts of the yokes.

\* \* \* \* \*